Aug. 11, 1931. W. E. NOBBE 1,818,153
PROCESS AND APPARATUS FOR FORMING SHEET GLASS
Filed Jan. 21, 1928  3 Sheets-Sheet 3
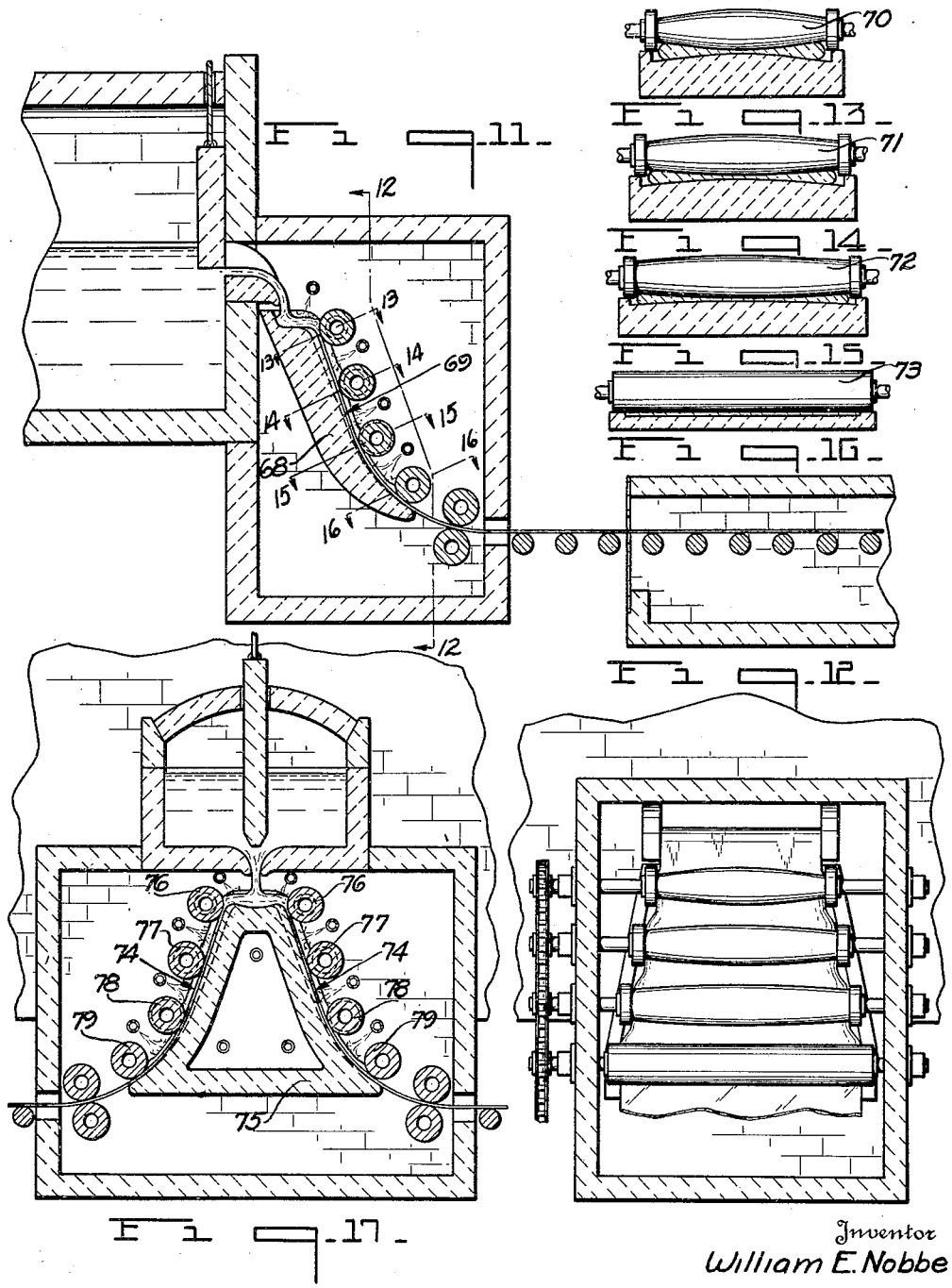
Inventor
William E. Nobbe
By Frank Fraser
Attorney Patented Aug. 11, 1931

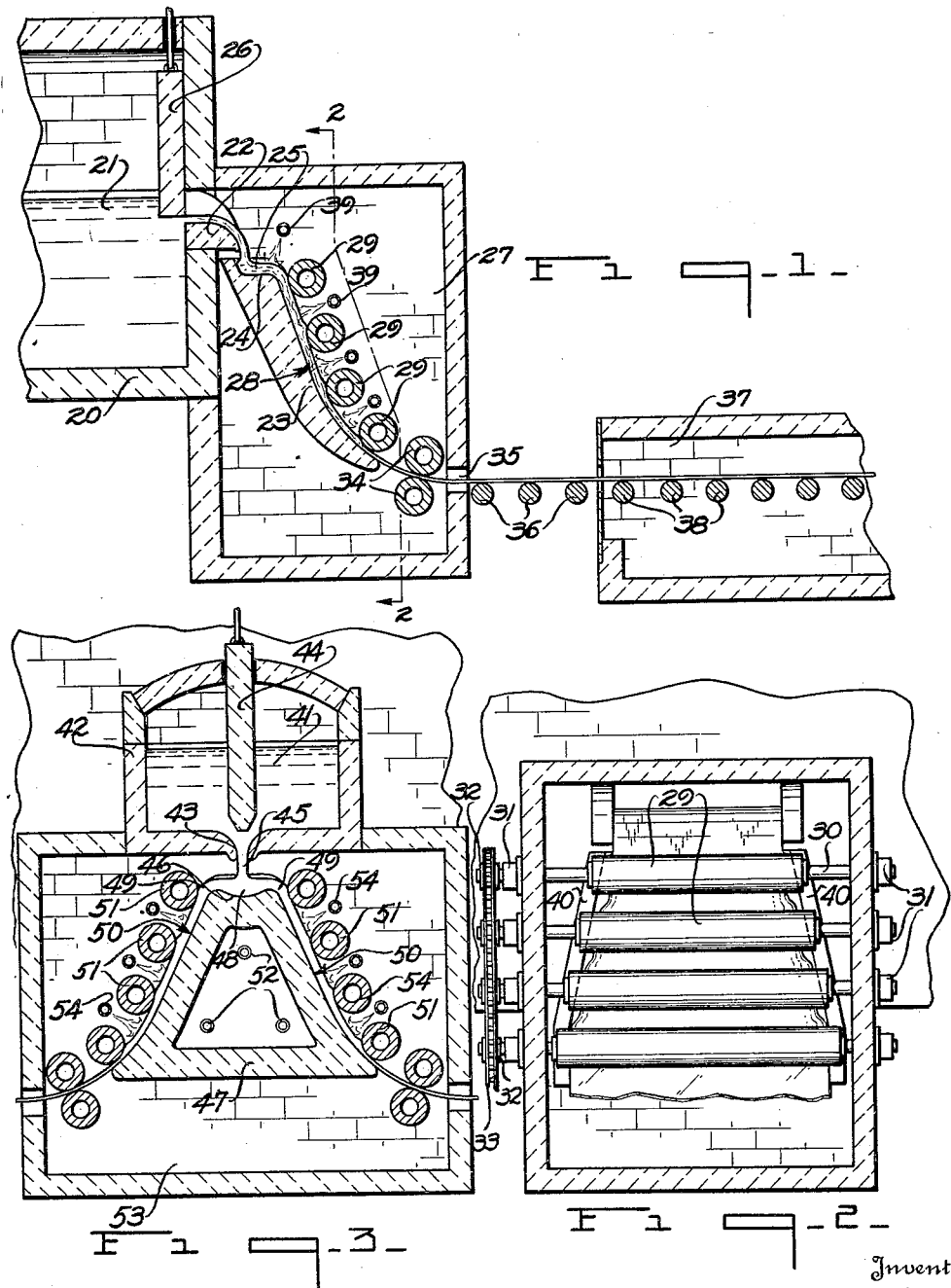

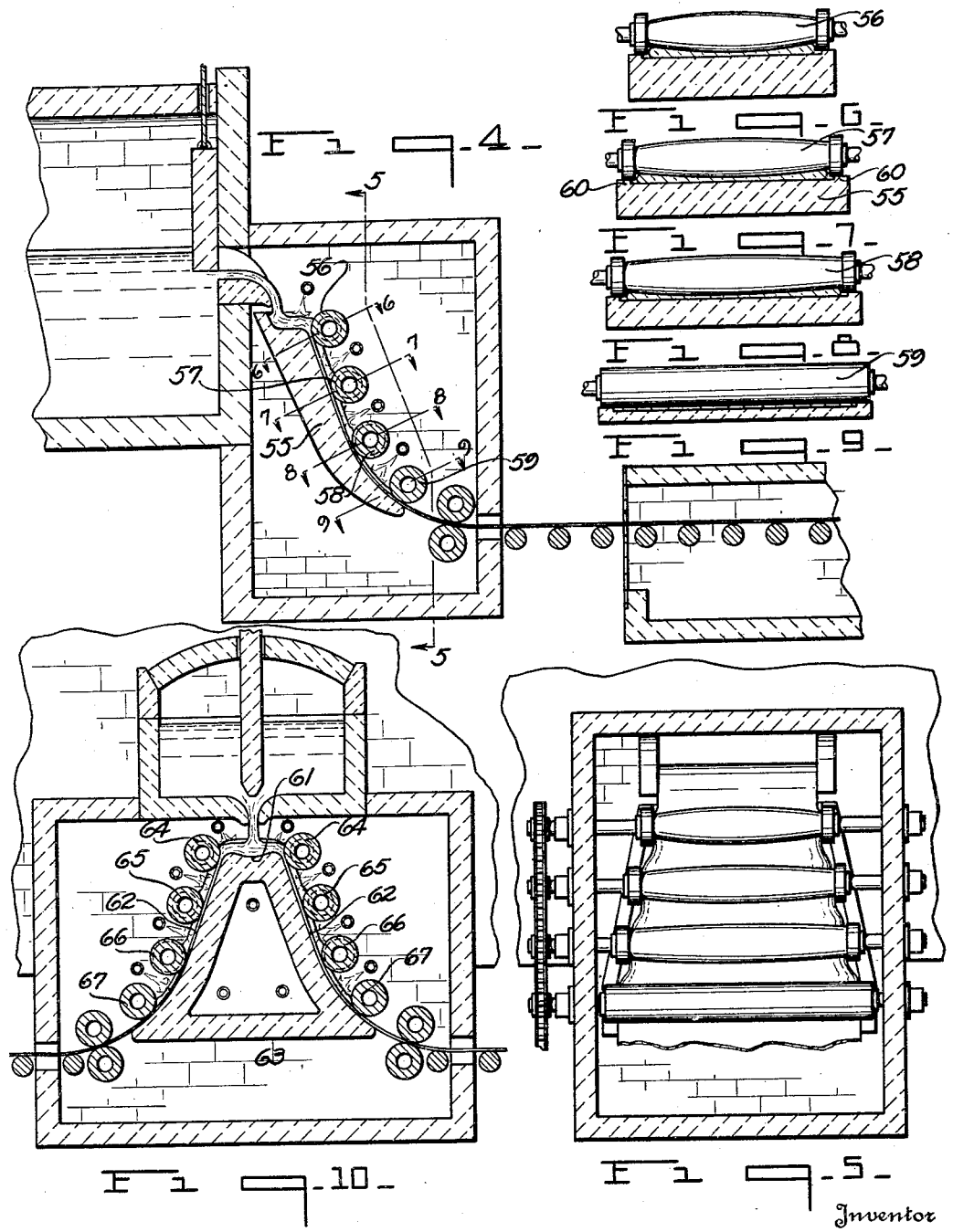

1,818,153

UNITED STATES PATENT OFFICE

WILLIAM E. NOBBE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR FORMING SHEET GLASS

Application filed January 21, 1928. Serial No. 248,375.

The present invention relates to sheet glass apparatus.

One of the objects of this invention is to provide a process and apparatus for the production of sheet glass wherein the molten glass is flowed downwardly and gradually reduced through successive stages to sheet form.

Another object of the invention is to provide a process and apparatus of this nature wherein molten glass is flowed downwardly from a molten bath and passed between sheet forming means and gradually reduced through successive stages to a sheet of substantially predetermined dimensions.

Still another object of the invention is to provide such a process and apparatus wherein a relatively thick stream of molten glass is flowed from a molten bath and passed between forming means and gradually reduced through successive stages to a sheet of substantially predetermined dimensions.

Still another object of the invention is to provide such a process and apparatus wherein a relatively thick stream of molten glass is flowed from a molten bath and passed between forming means and gradually reduced through successive stages to a sheet of substantially predetermined dimensions by spreading it outwardly from its center.

Still another object of the invention is to provide a process and apparatus of this nature wherein a relatively thick narrow stream of molten glass is flowed from a molten source and passed between a forming slab and a plurality of forming rolls which serve to gradually reduce the stream to a sheet of substantially predetermined thickness and width.

Still another object is to provide a process and apparatus of this character wherein a stream of molten glass is flowed downwardly from a molten source onto a forming slab whereupon the stream is divided and passed down both sides of the slab in engagement with a plurality of forming rolls which serve to gradually reduce the two separate streams to sheet of predetermined thickness and width whereupon two separate sheets may be simultaneously formed from a single source of molten glass.

Various other objects, advantages and novel details of construction of this invention will be made more apparent as this description proceeds, especially when considered in connection with the accompanying drawings, wherein:

Figure 1 is a fragmentary vertical longitudinal section through a sheet forming apparatus construction in accordance with my invention.

Figure 2 is a fragmentary vertical sectional view taken substantially on the plane indicated by line 2—2 in Figure 1.

Figure 3 is a vertical transverse sectional view through a modified form of construction.

Figure 4 is a view similar to Figure 1 of still another modified form of construction.

Figure 5 is a vertical sectional view taken substantially on the plane indicated by line 5—5 in Figure 4.

Figures 6 to 9 inclusive are detail sectional views taken substantially on the planes indicated by lines 6—6, 7—7, 8—8, and 9—9 of Figure 4.

Figure 10 is a vertical transverse sectional view through still another modified form of construction.

Figure 11 is a view similar to Figure 1 of still another modified form of construction.

Figure 12 is a vertical sectional view taken substantially on the plane indicated by line 12—12 in Figure 11.

Figures 13 to 16 inclusive are sectional views taken substantially on the planes indicated by lines 13—13, 14—14, 15—15 and 16—16 of Figure 11, and Figure 17 is a vertical sectional view through still another modified form of construction.

Referring to the drawings and more particularly to Figures 1 and 2 thereof it will be noted that there is illustrated the exit end 20 of a tank furnace adapted to contain a mass of suitably refined molten glass 21. A discharge lip 22 is associated with the end of the furnace and terminates above a slab 23 which may be adjustably mounted by means (not shown) if desired.

The slab is preferably provided with a troughed or recessed top 24 for receiving a mass or supply of molten glass 25 flowing from the furnace 20 over lip 22. An adjustable gate member 26 may be arranged in the furnace as shown to control the flow of glass passing to trough 24. The slab 23 and other co-operating sheet forming members, yet to be referred to, are all preferably arranged in a temperature controlled compartment 27.

The face 28 of the slab 23 over which the molten glass passes is transversely flat but the longitudinal contour of this surface is curved so that as the sheet leaves the longitudinal edge of the slab it is directed in a generally horizontal direction or plane. Co-operating with the slab 23 are a plurality of sheet forming members here shown as rolls 29. These rolls are mounted on shafts 30 which extend outwardly through the walls of chamber 27 and are journaled in suitable bearings 31. The rolls 29 are positively driven by any suitable means as for instance by means of sprockets 32 carried by the shafts 30 at one end thereof engageable by a driving chain 33.

From the examination of Figure 2 it will be noted that the slab 23 tapers in width from its lower end to its upper end, the longitudinal side edges thereof diverging from the top to the bottom of the slab. The rolls 29 are of respectively increasing lengths from the uppermost roll to the lowermost roll as also most clearly shown in Figure 2. In this manner a relatively narrow stream or mass of molten glass may be received upon the upper end of the slab and upon being flowed downwardly over the slab and between it and the forming rolls will be gradually reduced in thickness and simultaneously increased in width so that the resultant sheet will be of substantially predetermined dimensions.

In order to gradually reduce the thickness of the sheet the rolls 29 are arranged varying distances from the face 28 of slab 23, the uppermost roll 29 being arranged furthest from the slab and the successive rolls gradually approaching or being arranged closer to the face of the slab.

The rolls 29 may be adjustably mounted, if desired, by means (not shown) so that the distance between these rolls and the face 28 of the forming slab 23 can be varied.

The distance of the lowermost roll 29 from the face of the slab determines the thickness of the sheet produced. Arranged in proximity to the lower end of the slab is a pair of preferably positively driven rolls 34. These rolls may be formed of any suitable non-corrosive alloy and may be either heated or cooled as desired by passing a suitable temperature control medium through the bore of these rolls. The sheet is passed out of chamber 27 through an opening 35 in a substantially horizontal plane and is supported upon supporting rolls 36 and directed into a lehr 37 the sheet being supported therein upon supporting rolls 38. The temperature of the compartment 27 and also the temperature of the glass as it passed down the slab 23 can be controlled by suitable heating means such as burners 39. Ledges 40 are formed on the longitudinal edges of the slab 23 which serve to prevent the molten glass from flowing outwardly beyond the edge of the slab.

With the form of construction just described the molten glass 21 from the furnace 20 flows over lip 22 and into the trough or recess 24 formed in the upper end of slab 23. It then flows downwardly over the face 28 of this slab and between the slab and the forming rolls 29 which as mentioned are arranged varying distances from the face of the slab the distance between the slab and rolls successively decreasing from the uppermost to the lowermost roll. In this manner the thickness of the sheet being formed is gradually reduced. Furthermore the width of the slab gradually increases from its upper to its lower end so that as the thickness of the stream is reduced its width is increased so that the stream of molten glass is gradually reduced in thickness and simultaneously increased in width whereupon a sheet of substantially predetermined dimensions is obtained. By reason of the curvature of the operative face of the slab the formed sheet is directed in a substantially horizontal plane between rolls 34 and thence out of the compartment 27 where it is conducted to and through a lehr 37.

In Figure 3 a slightly modified form of construction is illustrated. In this form of construction a mass of molten glass 41 is flowed from the end of a furnace 42 through a discharge opening 43 which is controlled by means of a valve 44. The stream of molten glass 45 flows into a trough 46 arranged in the top of a slab 47. Molten glass 48 deposited in the trough 46 overflows in two streams 49 down the diverging sides or faces 50 of the slab.

Co-operating with each face 50 of the slab 47 is a plurality of forming rolls 51 similar in construction and operation to the forming rolls 29 of the previously described construction. That is, these rolls 51 are positively driven and are arranged varying distances from the faces 50 with the uppermost rolls spaced furthest from the adjacent face of the slab and the other rolls successively arranged nearer the face of the slab. These rolls are also of respectively increasing lengths from the uppermost roll to the lowermost roll to co-operate with the slab faces 50 which taper from the upper end thereof to the lower end.

The slab 47 may be made hollow as illustrated and the temperature thereof regulated preferably by means of burners 52. All of the sheet forming mechanism described is preferably located in a temperature controlled compartment 53 and the temperature of the glass as it passes through the sheet forming means may be controlled by any suitable heating means such as burners 54. As in the previously described construction the sheets as they leave the slab are directed in a substantially horizontal plane or direction and may be thereafter conducted to and through annealing lehrs such as lehr 37.

The construction and operation of the sheet forming means in the present form of construction is practically identical with the sheet forming means previously described with the exception that in the present form a double slab capable of simultaneously forming two sheets is provided. Thus with the present construction two separate and independent sheets may be continuously and simultaneously produced from a single source of molten glass.

The form of construction illustrated in Figures 4 to 9 inclusive differs from the form of construction illustrated in Figures 1 and 2 principally in the longitudinal contour or shape of the forming rolls.

In this form of construction a slab 55 is employed similar in operation and construction to slab 23. Associated with this slab are a plurality of rolls 56, 57, 58, and 59. As in the previously described construction the slab 56 increases in width from its upper end to its lower end and the rolls 56, 57, 58, and 59 respectively increase in length from the uppermost roll 56 to the lowermost roll 59.

The rolls 56, 57 and 58 taper from their centers toward their opposite ends while the lowermost roll 59 is cylindrical to create or form with the slab 55 a straight sheet forming pass having parallel sides. The degree of taper of the several rolls 56, 57 and 58 gradually decreases from the uppermost roll to the lowermost one so that the rolls gradually approach cylindrical form. The distance of the roll 59 from the slab 55 determines the thickness of the sheet produced. In this form of construction also the slab 55 will be provided with longitudinally extending ledges 60 arranged adjacent the longitudinal edges thereof so as to prevent the molten glass from flowing beyond the limits defined by these ledges. Due to the particular construction of the forming rolls, the space between these rolls and the forming slab successively decreases so that the stream of molten glass passing downwardly over the face of the slab is gradually reduced in thickness. Furthermore because of the formation of the rolls, the glass is spread outwardly from the center toward the opposite ends thereof and thus, the stream while being gradually reduced in thickness is simultaneously increased in width so that the resultant sheet will be of substantially predetermined dimensions.

Inasmuch as this form of construction is practically identical in every other respect to the form of construction illustrated in Figures 1 and 2 the remaining features thereof will not be again described in detail.

In Figure 10 another modified form of construction is illustrated this form being substantially similar to the form of construction illustrated in Figure 3 with the exception however, that the forming rolls instead of being cylindrical are of the double tapering construction similar to the forming rolls 56, 57, and 58 shown in the form of construction illustrated in Figures 4 to 9 inclusive. In this modified form of construction the glass stream is deposited in a pocket or recess 61 where it is divided and flows down the two faces 62 of the forming slab 63. Co-operating with each face of the furnace are co-operating rolls 64, 65, 66, and 67 similar in shape, construction and operation to the rolls 56, 57, 58 and 59 of the previously described construction. Thus with this form of apparatus the two streams of glass are each gradually reduced in thickness and the glass is spread outwardly from the center to the opposite ends thereof to thus gradually reduce the stream in thickness and simultaneously increase the width thereof so that the resultant sheets will be of substantially predetermined dimensions. Inasmuch as the remaining details of construction are practically identical with those of the previously described forms of apparatus the same will not be further described herein. Suffice it to say that the sheets, as they leave the forming slab are directed in a substantially horizontal plane and then supported and conveyed to and through annealing lehrs.

In Figures 11 to 16 inclusive still another modified form of construction is illustrated. This form of apparatus is substantially similar to that illustrated in Figures 4 to 9 inclusive with the single exception that the forming slab is of a slightly different shape. In the present construction the forming slab which is indicated generally by the reference character 68 has its operative or upper surface 69 thereof curved or bowed transversely with varying degrees of curvature so that the cross section curvature of the upper face 69 of the forming slab substantially inversely coincides with the longitudinal shape or configuration of either of the forming rolls 70, 71, 72 or 73 at that point in the longitudinal length of the slab immediately adjacent any one of the said forming rolls. In other words while the forming rolls 70, 71 and 72 taper from their centers toward their opposite ends the curvature of the upper face of the slab correspondingly varies from the upper end of the slab to that portion thereof in the vicinity of the roll 72. However as seen from an examination of Figure 16 the roll 73 is cylindrical in form and the adjacent surface of the slab is flat and parallel with the surface of this roll. Due to this particular construction of the forming rolls and the slab the space therebetween progressively changes so that the stream of molten glass passing down between the rolls is spread outwardly from the center towards the opposite ends thereof to thus gradually reduce the stream in thickness and to simultaneouly increase the same in width so that the resultant sheet will be of substantially predetermined dimensions. In all other respects this form of construction is identical with the form of construction illustrated in Figures 4 to 9 inclusive.

In Figure 17 still another modified form of construction is illustrated which is substantially identical with the form of construction illustrated in Figure 10. This form differs from the form illustrated in Figure 10 only in one particular: that is the operative faces 74 of the forming slab 75 are curved or bowed or otherwise shaped to conform inversely to the opposed shape or contour of the forming rolls 76, 77, 78, 79 which co-operate therewith to gradually reduce the streams of glass to sheets of substantially predetermined thickness and width. It should be understood that the rolls 76, 77, 78 and 79 correspond in character, shape and operation to the rolls 70, 71, 72 and 73 and that the cross sectional configuration of the two sides of the slab 75 corresponds to the cross sectional shape of slab 68. In all other respects the form of construction illustrated in Figure 17 is similar to the structures illustrated in Figures 3 and 10.

While several forms of the invention have been described and illustrated herein somewhat in detail it will be readily apparent to those skilled in this art that various other modifications, changes and re-arrangements may be resorted to without departing from the spirit and scope of this invention and to this end reservation is made to make such changes as may come within the purview of the accompanying claims.

I claim:

1. The process of forming sheet glass which consists in advancing a single stream of molten glass from a single source, dividing the stream to form two individual streams, flowing each individual stream substantially downwardly over a stationary surface, and subjecting the same while on said surface to a series of rolling operations to gradually reduce the thickness thereof to form a sheet of substantially predetermined dimensions.

2. The process of forming sheet glass which consists in setting up a single stream of molten glass from a single source, dividing the stream to form two individual streams, flowing each individual stream substantially downwardly over a stationary surface, subjecting the same while on said surface to a series of rolling operations to gradually reduce the thickness thereof during its downward travel to form a sheet of substantially predetermined dimensions, directing the finished sheet into a substantially horizontal plane, and annealing said sheet while traveling horizontally.

3. In sheet glass forming apparatus, the combination with means for flowing a stream of molten glass in a substantially downward direction, of a substantially vertically arranged stationary slab onto and down which said stream flows, and movable means mounted opposite the slab and cooperating therewith to gradually reduce the stream during its downward travel to sheet form, said movable means being arranged relatively closer to the slab at the lower end thereof than at its upper end.

4. In sheet glass forming apparatus, the combination with means for flowing a stream of molten glass in a substantially downward direction, of a substantially vertically arranged stationary slab onto and down which said stream flows, and a plurality of rolls mounted opposite the slab and cooperating therewith to gradually reduce the stream during its downward travel through successive stages to sheet form, the roll adjacent the lower end of the slab being arranged relatively closer thereto than the roll adjacent the upper end thereof.

5. In sheet glass apparatus, the combination with means for flowing a stream of molten glass in a generally downwardly direction, a substantially vertical slab for receiving the stream of glass, and a plurality of forming rollers mounted opposite the slab and cooperating therewith to reduce the stream during its downward travel to a sheet of substantially predetermined thickness and width, each successive roller from the top to the bottom of the slab being arranged relatively closer thereto.

6. In apparatus for forming sheet glass, the combination with means containing a source of molten glass and from which a single molten stream is adapted to flow, of a substantially vertically arranged forming slab positioned adjacent thereto and over and down which said stream is caused to pass, and a plurality of rotatable members mounted opposite the slab and cooperating therewith for gradually reducing the molten stream through successive stages to a sheet of substantially predetermined thickness, said rotatable members being arranged progressively closer to the slab from the uppermost member to the lowermost member.

7. In apparatus for forming sheet glass, the combination with means containing a source of molten glass and from which a single molten stream is adapted to flow, of a substantially vertically arranged forming slab positioned adjacent thereto and over and down which said stream is caused to pass, a plurality of rotatable members mounted opposite the slab and cooperating therewith for gradually reducing the stream to a sheet of substantially predetermined thickness, said members being constructed to reduce the thickness of the stream first at its center and to then subsequently reduce the end portions through successive stages to the same thickness.

8. In apparatus for forming sheet glass, the combination with means containing a source of molten glass and from which a single molten stream is adapted to flow, of a substantially vertically arranged forming slab positioned adjacent thereto and over and down which said stream is caused to pass, a plurality of rotatable members mounted opposite the slab and cooperating therewith for gradually reducing the stream through successive stages to a sheet of substantially predetermined thickness, the uppermost rotatable member tapering from its center towards its opposite ends and the lowermost rotatable member being substantially cylindrical.

9. In apparatus for forming sheet glass, the combination with means containing a source of molten glass and from which a single molten stream is adapted to flow, of a substantially vertically arranged forming slab positioned adjacent thereto and over and down which said stream is caused to pass, a plurality of rotatable members mounted opposite the slab and cooperating therewith for gradually reducing the stream through successive stages to a sheet of substantially predetermined thickness, the uppermost rotatable member tapering from its center towards its opposite ends and the succeeding lower members gradually approaching cylindrical form.

10. In apparatus for forming sheet glass, the combination with means containing a source of molten glass and from which a single molten stream is adapted to flow, of a substantially vertically arranged forming slab positioned adjacent thereto and over and down which said stream is caused to pass, and a plurality of rotatable members mounted opposite the slab and cooperating therewith for gradually reducing the stream through successive stages to a sheet of substantially predetermined thickness, the uppermost rotatable member tapering from its center towards its opposite ends and the succeeding lower rolls gradually approaching cylindrical form, the stream engaging surface of said slab being bowed transversely with varying degrees of curvature from top to bottom thereof so that the cross section curvature of said surface of the slab substantially inversely coincides with the longitudinal contour of the opposed rotatable members.

11. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith for gradually thinning the stream through successive stages to a sheet of substantially predetermined thickness, said rotatable members being arranged progressively closer to the slab from the uppermost member to the lowermost member.

12. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith for gradually reducing the stream to a sheet of substantially predetermined thickness, said members being constructed to reduce the thickness of the stream first at its center and to then subsequently reduce the end portions through successive stages to the same thickness.

13. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith for gradually reducing the stream through successive stages to a sheet of substantially predetermined thickness, the uppermost rotatable member tapering from its center towards its opposite ends and the lowermost roll being substantially cylindrical.

14. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith for gradually reducing the stream through successive stages to a sheet of substantially predetermined thickness, the uppermost member tapering from its center towards its opposite ends and the succeeding lower members gradually approaching cylindrical form.

15. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith for gradually reducing the stream through successive stages to a sheet of substantially predetermined thickness, the uppermost member tapering from its center towards its opposite ends and the succeeding lower members gradually approaching cylindrical form, each side face of said slab being bowed transversely with varying degrees of curvature from top to bottom thereof, so that the cross section curvature of said face of the slab substantially inversely coincides with the longitudinal contour of the opposed rotatable members.

16. In apparatus for forming sheet glass, the combination with means containing a source of molten glass and from which a single molten stream is adapted to flow, of a forming slab positioned adjacent said means and having a trough in its upper end for receiving the stream therefrom, said slab being also provided with substantially vertical downwardly diverging side faces whereby the glass within the trough will overflow therefrom in two individual streams down the diverging side faces of said slab, and a plurality of rotatable members mounted opposite each face of the slab and cooperating therewith to gradually reduce the stream through successive stages to a sheet of substantially predetermined thickness, said slab being substantially hollow, and means for internally controlling the temperature thereof.

17. The process of forming sheet glass, which consists in flowing a stream of molten glass downwardly over a stationary surface, reducing the thickness of the stream while on said surface first at its center, and in then reducing the end portions of said stream to the same thickness.

18. The process of forming sheet glass, which consists in flowing a stream of molten glass downwardly over a stationary surface, reducing the thickness of the stream while on said surface first at its center, and in then gradually reducing the end portions of the stream while on said surface through successive stages to the same thickness by spreading the glass outwardly from its center.

19. The process of forming sheet glass, which consists in advancing a single stream of molten glass from a single source, dividing the stream to form two individual streams, flowing each individual stream substantially downwardly over a stationary surface, reducing the thickness of the stream while on said surface first at its center, and in then reducing the end portions of the stream to the same thickness.

20. The process of forming sheet glass, which consists in advancing a single stream of molten glass from a single source, dividing the stream to form two individual streams, flowing each individual stream substantially downwardly over a stationary surface, reducing the thickness of the stream while on said surface first at its center, and in then gradually reducing the end portions of the stream while on said surface through successive stages to the same thickness by spreading the glass outwardly from its center.

21. The process of forming sheet glass, which consists in flowing a stream of molten glass downwardly over a stationary surface, and in subjecting the same while on said surface to a series of rolling operations to gradually reduce the thickness thereof to form a sheet of substantially predetermined dimensions.

Signed at Toledo, in the county of Lucas and State of Ohio, this 20th day of January, 1928.

WILLIAM E. NOBBE.